US005209435A

United States Patent [19]
Edwards

[11] Patent Number: 5,209,435
[45] Date of Patent: May 11, 1993

[54] PASSSENGER CAR WITH EMERGENCY EXIT

[75] Inventor: Lawrence K. Edwards, Falls Church, Va.

[73] Assignee: Futrex, Inc., Fairfax County, Va.

[21] Appl. No.: 803,023

[22] Filed: Dec. 6, 1991

Related U.S. Application Data

[63] Continuation-in-part of Ser. No. 426,322, Oct. 24, 1989, abandoned.

[51] Int. Cl.[5] ......................... B60D 5/00; B61D 17/14; B64C 1/22; B66C 23/10

[52] U.S. Cl. ............................... 244/137.2; 244/137.1; 244/118.3; 105/348; 105/8.1; 212/154; 414/699

[58] Field of Search ................ 105/348, 349, 459, 8.1; 182/281, 142; 5/83, 88; 212/152, 154, 146, 156; 414/540-542, 545, 553, 699, 342, 347, 348, 496; 244/118.1, 129.5, 118.3, 137.1, 137.2; 254/32.9

[56] References Cited

U.S. PATENT DOCUMENTS

| | | | |
|---|---|---|---|
| 501,343 | 7/1893 | Herzberg | 294/67.4 |
| 2,020,306 | 11/1935 | Fitch | 254/296 |
| 2,075,042 | 3/1937 | Knerr | 244/137.1 |
| 2,088,655 | 8/1937 | King | 105/348 |
| 2,110,239 | 3/1938 | Richter | 414/545 |
| 2,268,009 | 12/1941 | Babb et al. | 244/137.1 |
| 2,425,972 | 8/1947 | Watter | 244/137.1 |
| 2,498,161 | 2/1950 | Hamilton | 414/545 |
| 2,529,908 | 11/1950 | Bortner et al. | 244/137.1 |
| 2,577,287 | 12/1951 | Sullivan | 280/418.1 |
| 2,639,107 | 5/1953 | Brown | 244/137.1 |
| 2,759,691 | 8/1956 | Weaver et al. | 244/137.1 |
| 3,002,719 | 10/1961 | Weiland et al. | 244/118.1 |

(List continued on next page.)

FOREIGN PATENT DOCUMENTS

| | | | |
|---|---|---|---|
| 120506 | 11/1945 | Australia . | |
| 00-71959 | 2/1983 | European Pat. Off. | 414/921 |
| 735299 | 5/1943 | Fed. Rep. of Germany | 244/137 R |
| 2821172 | 11/1978 | Fed. Rep. of Germany | 114/362 |
| 3514581 | 1/1987 | Fed. Rep. of Germany . | |
| 1038570 | 9/1953 | France . | |
| 1271534 | 8/1961 | France . | |
| 186540 | 11/1982 | Japan . | |
| 270225 | 11/1988 | Japan . | |
| 00-09060 | 1/1989 | Japan . | |
| 138003 | 11/1952 | Sweden | 254/296 |
| 218533 | 1/1968 | Sweden . | |
| 167068 | 8/1921 | United Kingdom | 244/14 |
| 745721 | 2/1955 | United Kingdom . | |
| 727159 | 3/1955 | United Kingdom | 244/118 |
| 860009 | 2/1961 | United Kingdom | 244/137.1 |
| 2150895 | 7/1985 | United Kingdom . | |

OTHER PUBLICATIONS

N.Y. Times Article of German Invention for Rescuing Sailors, Sep. 24, 1914.

*Primary Examiner*—Joseph F. Peters, Jr.
*Assistant Examiner*—Virna Lissi Ansley
*Attorney, Agent, or Firm*—Senniger, Powers, Leavitt & Roedel

[57] ABSTRACT

An elevated passenger car having an emergency exit feature. The passenger car is of the type supported such that there are substantially no obstructions between the underside of the car and the ground below it. The car includes a body having a passenger compartment and an opening through the body generally at one end thereof defining an exit from the passenger compartment to outside the body. An end section is pivotally mounted on the body at the one end. Fluid pressure actuated cylinders swing the end section between a closed position in which the end section closes the exit and an open position in which said exit is opened to the outside. An elevator supported by the end section in its open position lowers passengers from the elevated passenger car.

15 Claims, 7 Drawing Sheets

U.S. PATENT DOCUMENTS

| | | | |
|---|---|---|---|
| 3,051,419 | 8/1962 | Weiland et al. | 244/118.1 |
| 3,065,934 | 11/1962 | Jackson | 244/137.1 |
| 3,174,634 | 3/1965 | Peck | 212/264 |
| 3,183,998 | 5/1965 | Major | 114/362 |
| 3,358,968 | 12/1967 | Walsh et al. | 254/279 |
| 3,416,677 | 12/1968 | Abfalter | 414/545 |
| 3,421,165 | 1/1969 | Pugh | 441/83 |
| 3,539,070 | 11/1970 | Dunlea, Jr. | 182/142 |
| 3,561,704 | 2/1971 | Schulze | 244/137.1 |
| 3,601,342 | 8/1971 | Piasecki | 212/230 |
| 3,602,545 | 8/1971 | Lindenbauer | 105/8.1 |
| 3,605,935 | 9/1971 | Gilbert | 296/35.3 |
| 3,677,424 | 7/1972 | Anderson | 414/921 |
| 3,869,168 | 3/1975 | Matheson | 414/545 |
| 3,905,493 | 9/1975 | Logue | 414/557 |
| 4,002,321 | 1/1977 | Shaw et al. | 254/288 |
| 4,155,468 | 5/1979 | Royce | 414/921 |
| 4,180,366 | 12/1979 | Roth et al. | 414/921 |
| 4,194,257 | 3/1980 | Martin et al. | 441/80 |
| 4,216,725 | 8/1980 | Hallem | 105/348 |
| 4,221,528 | 9/1980 | Gordos | 414/463 |
| 4,339,224 | 7/1982 | Lamb | 414/921 |
| 4,365,924 | 12/1982 | Brigman et al. | 414/549 |
| 4,473,160 | 9/1984 | Neuenschwander | 212/225 |
| 4,478,312 | 10/1984 | Kurtg's | 182/142 |
| 4,566,842 | 1/1986 | Clarke | 414/541 |
| 4,583,466 | 4/1986 | Reddy et al. | 414/921 |
| 4,615,275 | 10/1986 | Ishzuka | 105/348 |
| 4,639,182 | 1/1987 | Inaba et al. | 414/543 |
| 4,666,357 | 5/1987 | Babbi | 212/191 |
| 4,788,926 | 12/1988 | Ullman et al. | 114/362 |
| 4,858,981 | 8/1989 | Post | 414/540 |
| 4,883,301 | 11/1989 | Pugh | 441/83 |

PASSSENGER CAR WITH EMERGENCY EXIT

This application is a continuation-in-part of application Ser. No. 07/426,322, filed Oct. 24, 1989 now abandoned.

BACKGROUND OF THE INVENTION

This invention relates generally to elevated passenger cars and more particularly to an elevated passenger car having an emergency exit feature.

The invention is related to elevated passenger cars of the kind which are supported from the side or above such that the underside of the car is substantially open to the ground below. Reference is made to U.S. Pat. No. 3,890,904 which discloses a railway system including such a passenger car. Special problems are involved with evacuation of passengers from an elevated car when it is immobilized or when it is otherwise necessary to evacuate one or more passengers from the car at a location away from a passenger station. Clearly, the passengers may not exit directly from the car to the ground. Evacuation to the support structure of the car track requires the construction of costly walkways. The additional structure required for such walkways significantly hinders the design goals of compactness and aesthetic appeal for railway systems of the type to which this invention is particularly applicable.

SUMMARY OF THE INVENTION

Among the several objects of the invention may be noted the provision of an elevated passenger car from which passengers may be evacuated at locations away from a passenger station; the provision of such a passenger car from which emergency exit feature may be made without the provision of additional structure on the support for the car; the provision of such a passenger car from which passengers may exit to a second passenger car; the provision of such a passenger car from which passengers may be lowered to the ground beneath the car; the provision of such a passenger car from which passengers may be lowered to the ground despite a loss of external power to the car; and the provision of such a passenger car with an emergency exit which is relatively inexpensive.

In general, an elevated passenger car of the present invention is adapted for emergency exit from the car. The passenger car is of the type adapted to be supported in its elevated position such that there are no obstructions between at least a portion of the underside of the car and the ground below it. The car comprises a body having a passenger compartment and an opening through the body generally at one end which defines an exit from the passenger compartment to outside the body. An end section is pivotally mounted on the body at the stated one end, and the car is provided with means for swinging the end section between a closed position in which the end section closes said exit and an open position in which said exit is opened to the outside. An elevator supported by the end section of the passenger car lowers passengers from the car.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF A PREFERRED EMBODIMENT

Figure 3:
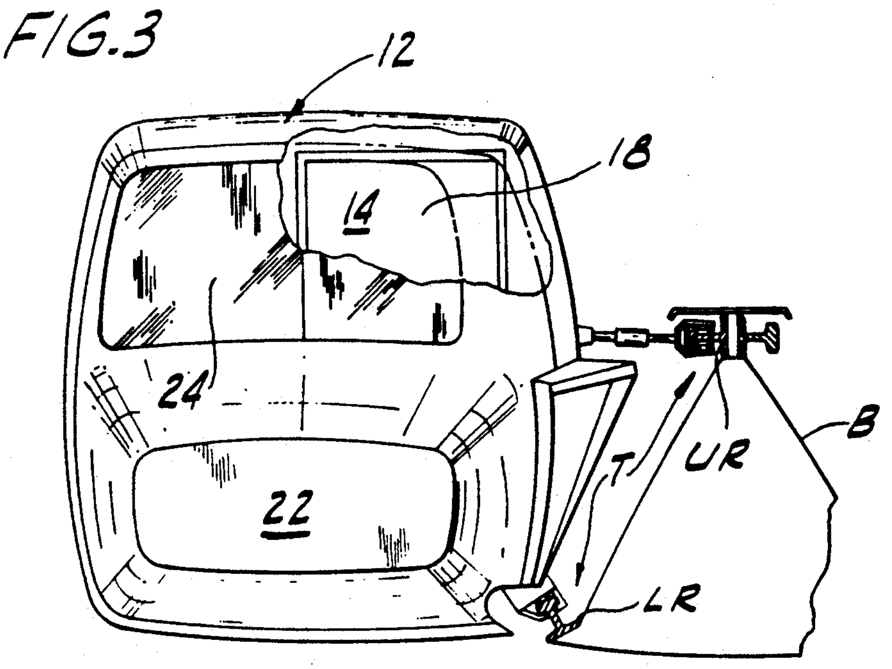
FIG. 3 is a front view of the passenger car with parts broken away to show detail.

Referring now to the drawings, an elevated passenger car, indicated generally at 10, of the present invention, having a top, bottom, sides, and a longitudinally opposite front and rear, is adapted to be supported in its elevated position such that there are no obstructions between at least a portion of the underside of the car and the ground beneath it. An elevated passenger car of the type generally described is shown in fig. 3. The car 10 travels alongside a beam B on a track T mounted on the beam. The track T includes an upper rail UR and a lower rail LR extending longitudinally of the beam with the car 10 being supported and guided on the lower rail and interconnected with the upper rail for holding the car against overturning. Although the emergency escape feature described herein is shown as part of a car of the type supported from the side, it may also be incorporated in elevated cars supported from the top or bottom (such as a monorail). The passenger car 10 is further adapted for emergency exit from the car such as when it has been immobilized or when it otherwise becomes necessary to evacuate one or more passengers P at a location away from a passenger station. The passenger car 10 comprises a body, indicated generally at 12, having a passenger compartment 14 and windows 16 providing a view from the passenger compartment to the outside. A compartment at the front end of the car is provided for the operator and includes a window 17 for viewing through the side of the body 12. As seen in FIG. 3, an opening through the body 12 at its (front) end defines an exit 18, from the passenger compartment 14 to outside the body. An end section 22 of the car 10, including the front windshield 24 of the car, is pivotally mounted by suitable fasteners 26 on the body 12 at the end near the top of the car. It is to be understood that it is within the scope of this invention to locate the exit and the pivotally mounted end section at the rear end of the car.

Figure 1:
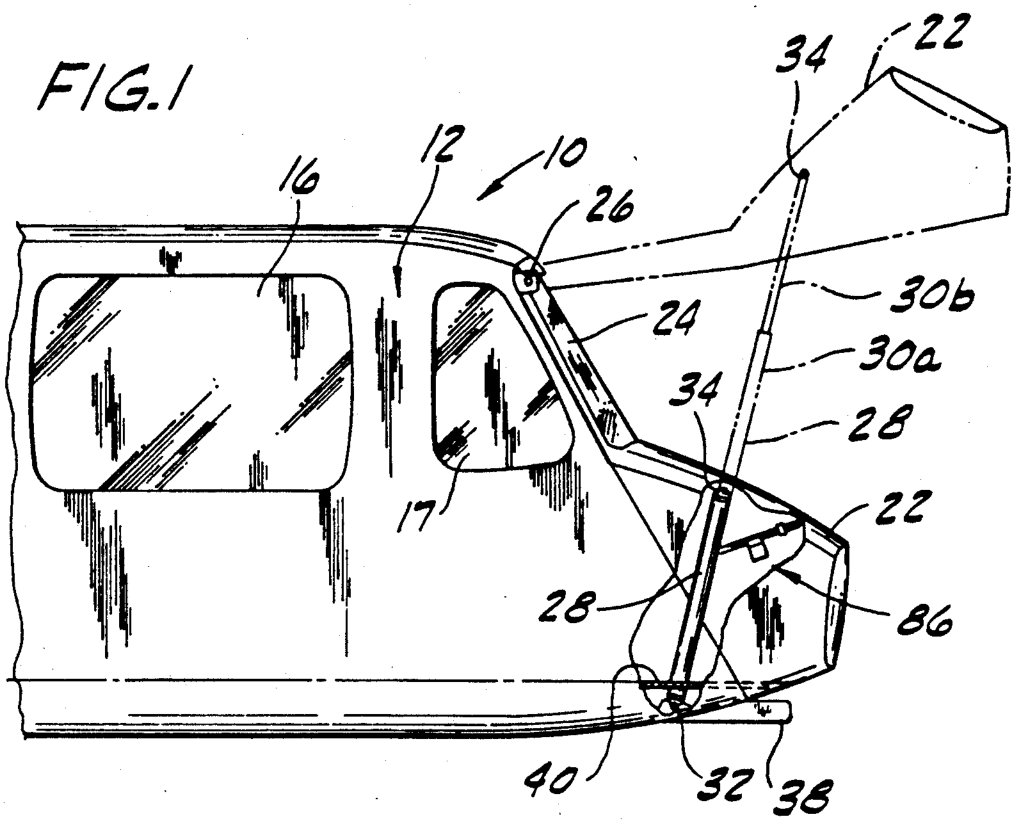
FIG. 1 is an elevation of the front portion of an elevated passenger car of this invention with parts broken away to show detail.
Figure 2:
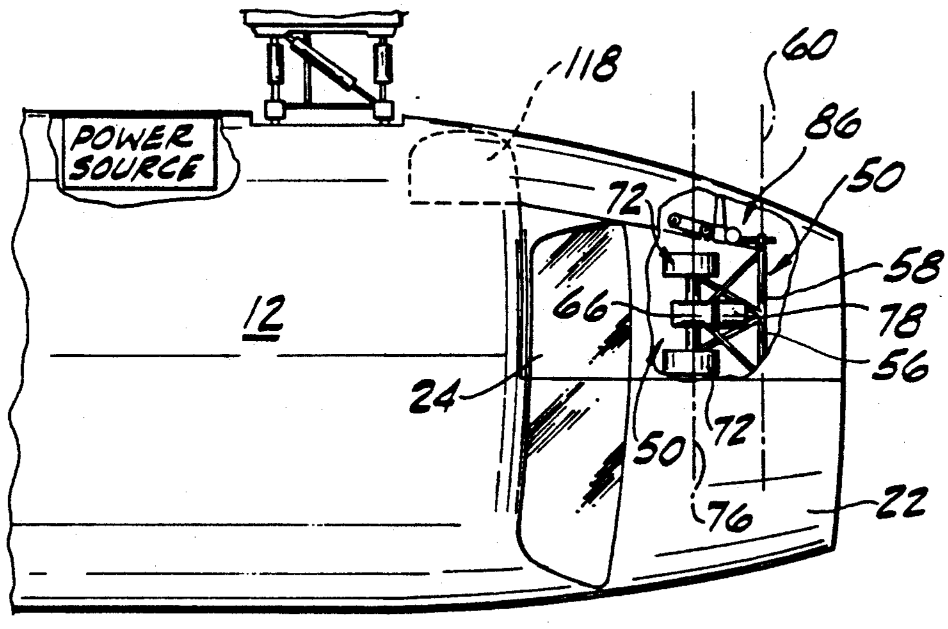
FIG. 2 is a plan view of the passenger car of FIG. 1 with parts broken away to show detail.

Means, constituting a pair of struts 28, is provided for swinging the end section 22 between a closed position in which the end section closes the exit 18 (shown in solid in FIG. 1), and an open position in which the exit is open to the outside (shown in phantom in FIG. 1). Each strut comprises sections 30, 30*a* and 30*b* fitted together in telescoping arrangement so that the struts are extensible and retractable, and is pivotally mounted at one end 32 to the body 12 and pivotally mounted at its opposite end 34 to the end section 22. Self-contained pneumatic or hydraulic means (not shown) aboard the car 10 supplies fluid under pressure to the struts 28 for actuating motion of the struts between a retracted position in which the end section is in the closed position, and an extended position in which the stated end section is in the open position.

Figure 4:
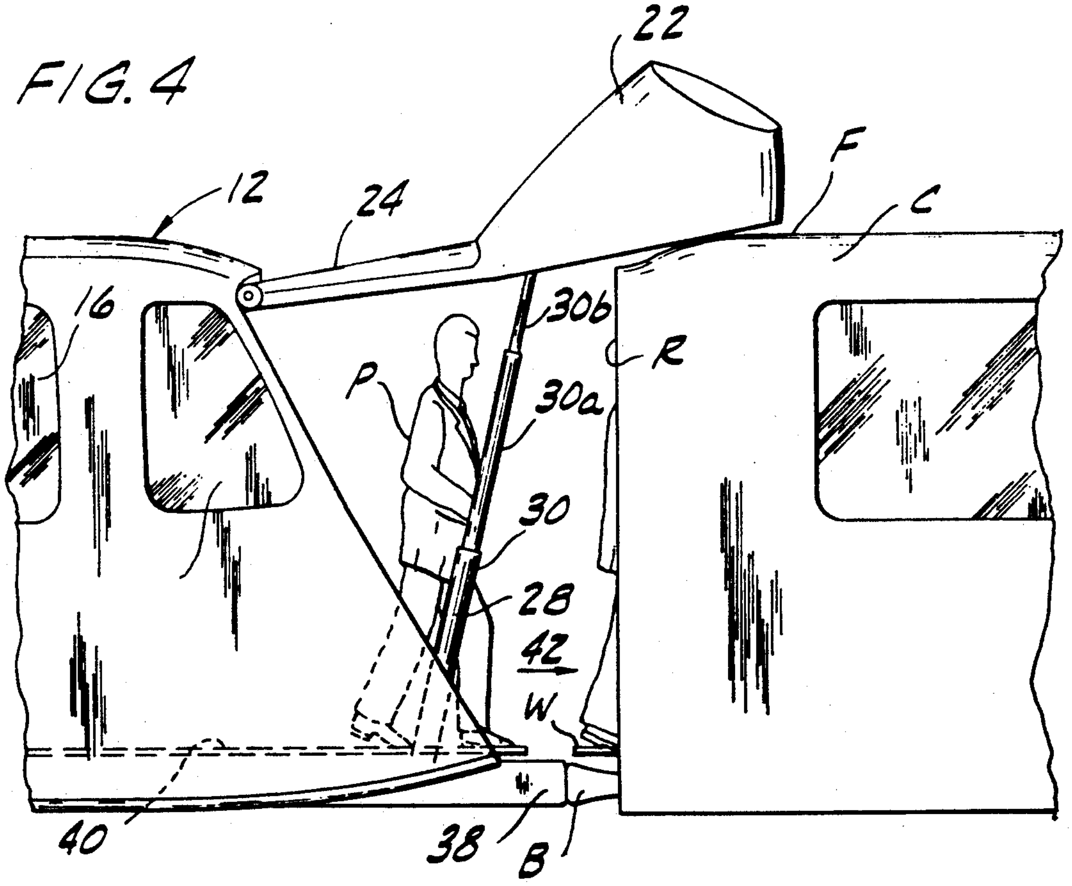
FIG. 4 is a view of the passenger car with its end section open for evacuation of passengers to another passenger car and with part of the end section broken away to show detail.

As shown in FIG. 4, the passenger car 10 has a front bumper 38 adapted to engage a rear bumper B of another passenger car C having an opening in its rear end R and a walkway W passing through the opening. At the front end of the car 10 just below the end section and outside the exit opening 18 in the body 12 is a platform 40 for debarking from the car in circumstances requiring emergency exit from the car. In its open position, the end section 22 is raised sufficiently high to clear the roof F of the other passenger car C when it is backed up to the front of the disabled car 10 and also has sufficient clearance from the debarking platform so that even a man of greater than average height may stand upright on the platform with clearance between his head and the underside of the end section. When the cars are engaged as shown in FIG. 4, the debarking platform 40 and the walkway W define a path 42 along which the passengers P may exit the disabled car 10 and enter the passenger compartment of the other car C.

Figure 6:
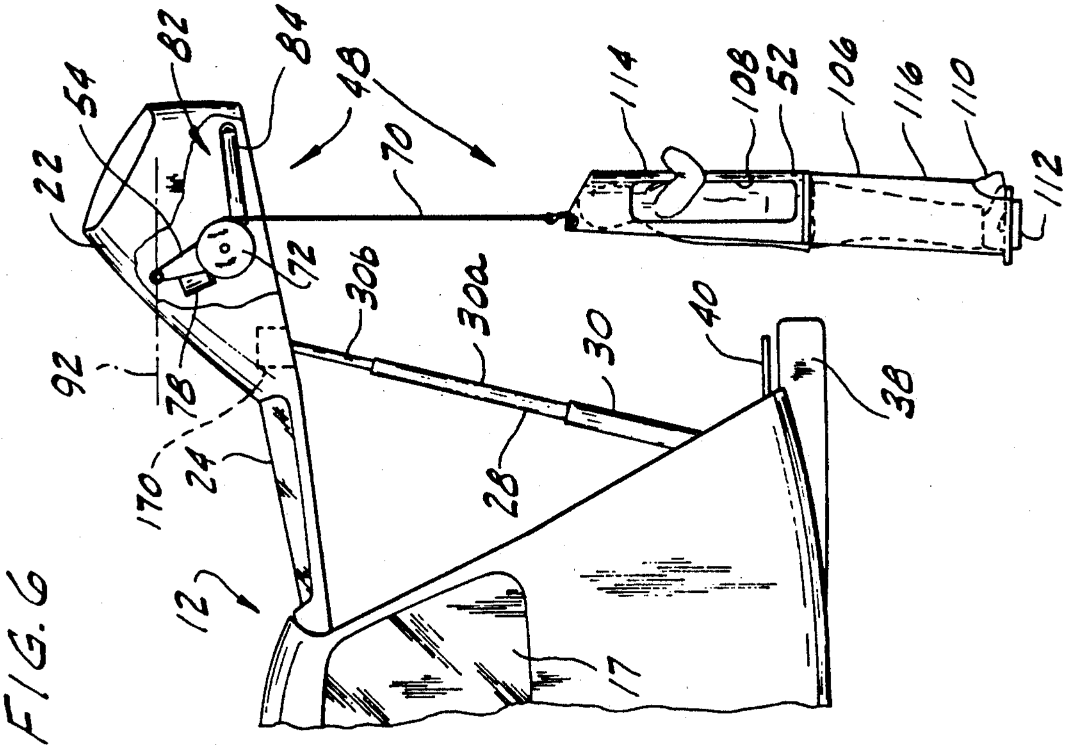
FIG. 6 is a view of the passenger car with its elevator in the descent position and with part of the end section broken away to show detail.
Figure 5:
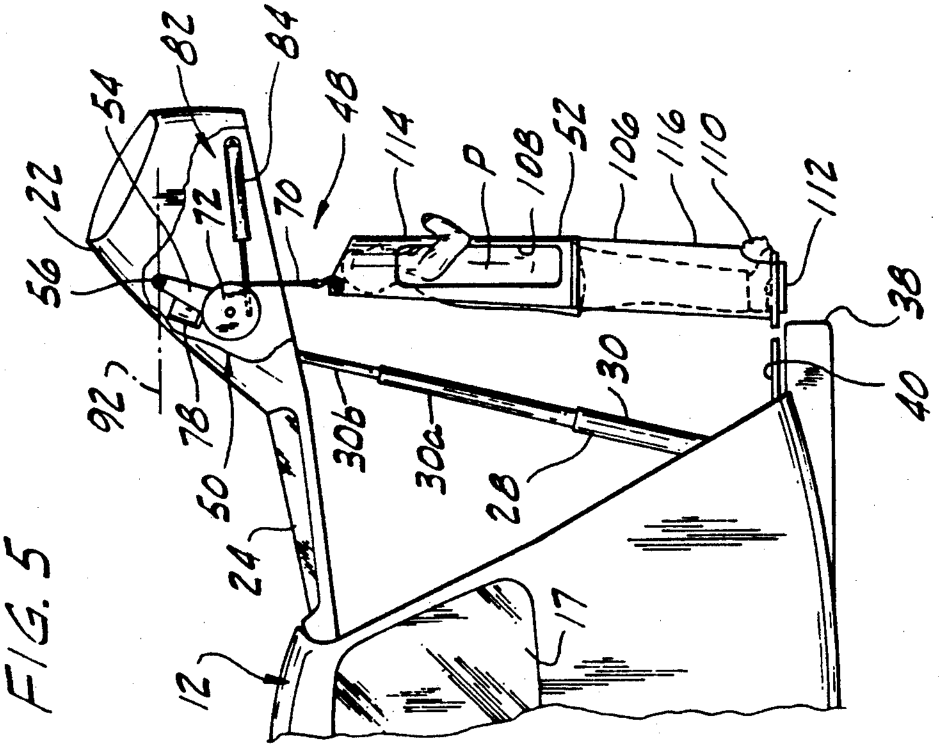
FIG. 5 is a view of the passenger car with its elevator in a loading position and with part of the end section broken away to show detail.

Referring now especially to FIGS. 5 and 6, the elevated passenger car 10 of the present invention has an elevator, generally indicated at 48, supported by the end section 22 for lowering passengers from the car in the event another car cannot be used to evacuate the passengers. The elevator 48 includes winch means constituting a winch, indicated generally at 50, mounted on the concave underside of the end section 22 and an escape pod 52 adapted to be suspended from the winch. The winch may be positioned so that the pod 52 is suspended near the side of the car 10. In that arrangement, the pod 52 would be able to travel from the car 10 to the ground and avoid a centrally located support such as with a monorail system. Because of the concavity of the end section 22 on its underside, the moving parts of the winch 50 are recessed into the end section so that they do not obstruct movement of the passengers on the debarking platform 40. The winch 50 comprises a frame 54 including a support bar 56 on its first side 58 mounted on the underside of the end section 22 for pivoting about a first axis 60 constituting the longitudinal axis of the support bar, and a shaft 62 journalled in a sleeve 64 at a second side 66 of the frame 54 generally opposite the first side.

Figure 7:
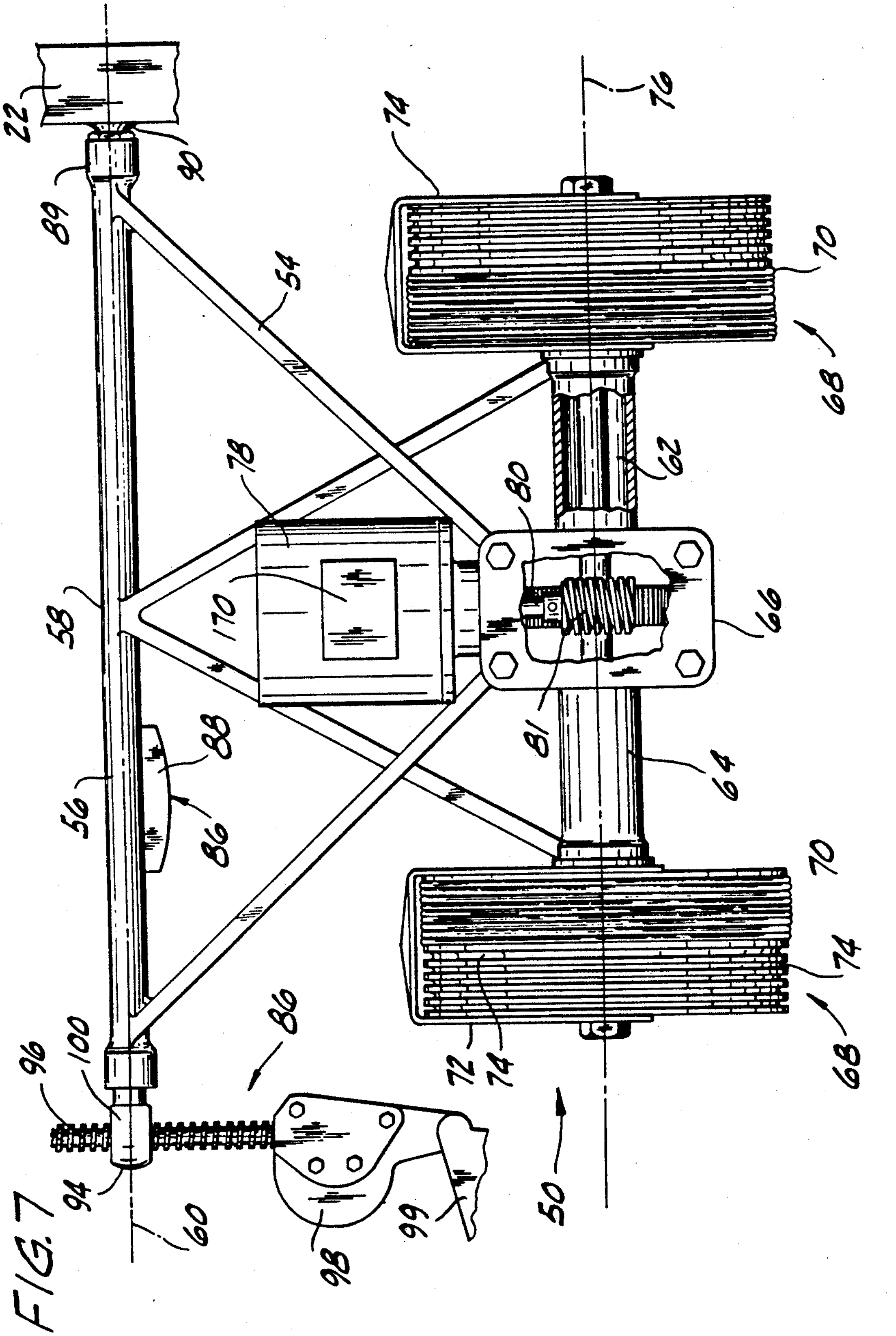
FIG. 7 is an enlarged fragmentary front view of a winch of the passenger car.

Cable holding means, indicated generally at 68, mounted on the frame 54 at the second side 66 holds at least two lengths of cable 70 adapted to be attached at its lower end to the elevator pod to suspend the pod below the cable holding means. The use of two lengths of cable attached at spaced apart locations to the escape pod 52, prevents the pod from turning about a vertical axis so that the pod is stable during boarding by a passenger, and during descent. Further, having two cables provides a measure of safety in case of failure of one of the cables. The cable holding means 68 comprises a pair of drums 72 which are mounted at spaced apart locations on shaft 62 at the second side of the frame. The drums 72 each hold a length of cable 70 received in a groove 74 on the drum. Each cable 70 may be connected to the escape pod 52 at laterally spaced apart locations for suspending the car from the winch 50. The drums 72 are rotatable about a second axis 76, constituting the axis of rotation of the drums, such that cable 70 is either let out or reeled in by the drums for lowering or raising the pod 52. A reversible motor 78 mounted on the frame 54 and powered by an on-board, self-contained power source (not shown), rotates the drums to raise and lower the pod. Power is transmitted from a drive shaft 80 of the motor 78 to the drums 72 by engagement of a worm gear 81, constituting part of the drive shaft 80, with the shaft 62 (see FIG. 7).

Means generally indicated at 82 is operable to move the elevator 48 between a loading position (FIG. 5) in which the escape pod 52 is located closely adjacent the forward end of the debarking platform 40 so that a passenger p may easily step into the car from the platform and a descent position (FIG. 6) in which the pod is spaced away from the forward end of the debarking platform and clear of the car body 12 for descent to the ground below. The elevator moving means 82 comprises a cylinder 84 mounted at one end on the underside of the end section 22 and attached to the second side 66 of the frame 54 at its second end. The cylinder 84 may be extended and retracted to pivot the frame 54 about its first axis 60 between the loading position and the descent position.

Circumstances may be encountered during the emergency evacuation of the passengers, such as when the car is stopped on a banked turn, where the floor of the passenger car and the debarking platform 40 is at an angle with the horizontal. In that event, the shaft 62 of the winch and therefore the axis of rotation 76 of the drums 72 will be at an angle with the horizontal. Leveling means, indicated generally at 86, associated with the winch 50 detects the roll angle of the car 10 and hence the angular deviation of axis of rotation 76 of the drums from a true horizontal, and levels the axis of rotation. The leveling keeps both cables in tension so that untensioned cable will not become tangled in the winch. In addition, the pod may spin about a vertical axis and be tilted from the vertical if one of the cables is not in tension. The leveling means 86 includes a sensor 88 mounted on the support bar 56 of the frame 54 for detecting the roll angle of the car 10 and support bar. The roll angle of the support bar 10 from horizontal is the same as the roll angle of the shaft 62 because both are substantially parallel. The first end 89 of the support bar 56 is mounted on the end section 22 by a universal joint 90 which allows the support bar 56 to pivot about the first axis 60 and about a third, substantially horizontal axis 92 generally perpendicular to the axis of rotation 76 of the drums 72 (see FIG. 5). The second end 94 of the support bar 56 is attached to a drive shaft 96 of a leveling motor 98 which is mounted on the nose section 22 by a bracket 99. The leveling motor 98 gets power from a power source on the car and is connected in a suitable fashion to sensor 88 so that it is controlled by the sensor. The second end 94 of the support bar 56 terminates in an eyebolt 100 through which the drive shaft 96 is received and threadably engaged in a universal joint (not shown) such that when the drive shaft rotates the second end 94 of the support bar moves longitudinally of the drive shaft over short distances so that the frame is pivoted about the third axis 92 to maintain the axis of rotation of the drums 76 substantially horizontal. Rotation of the drive shaft 96 for leveling the frame 54 is controlled by signals generated by the level sensor 88.

Figure 10:
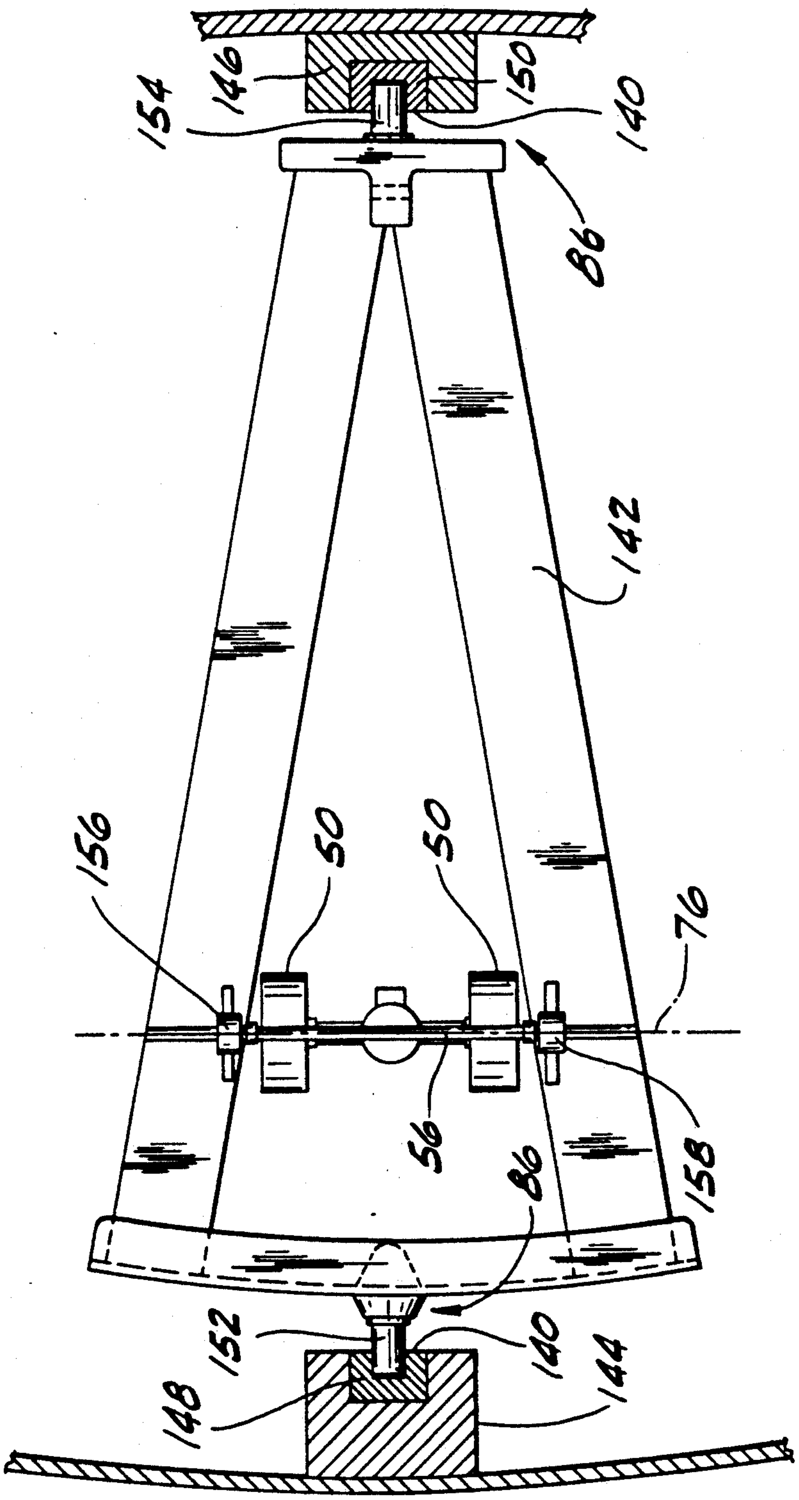
FIG. 10 is an enlarged fragmentary plan view of the winch and a gimbal of the passenger car.
Figure 11:
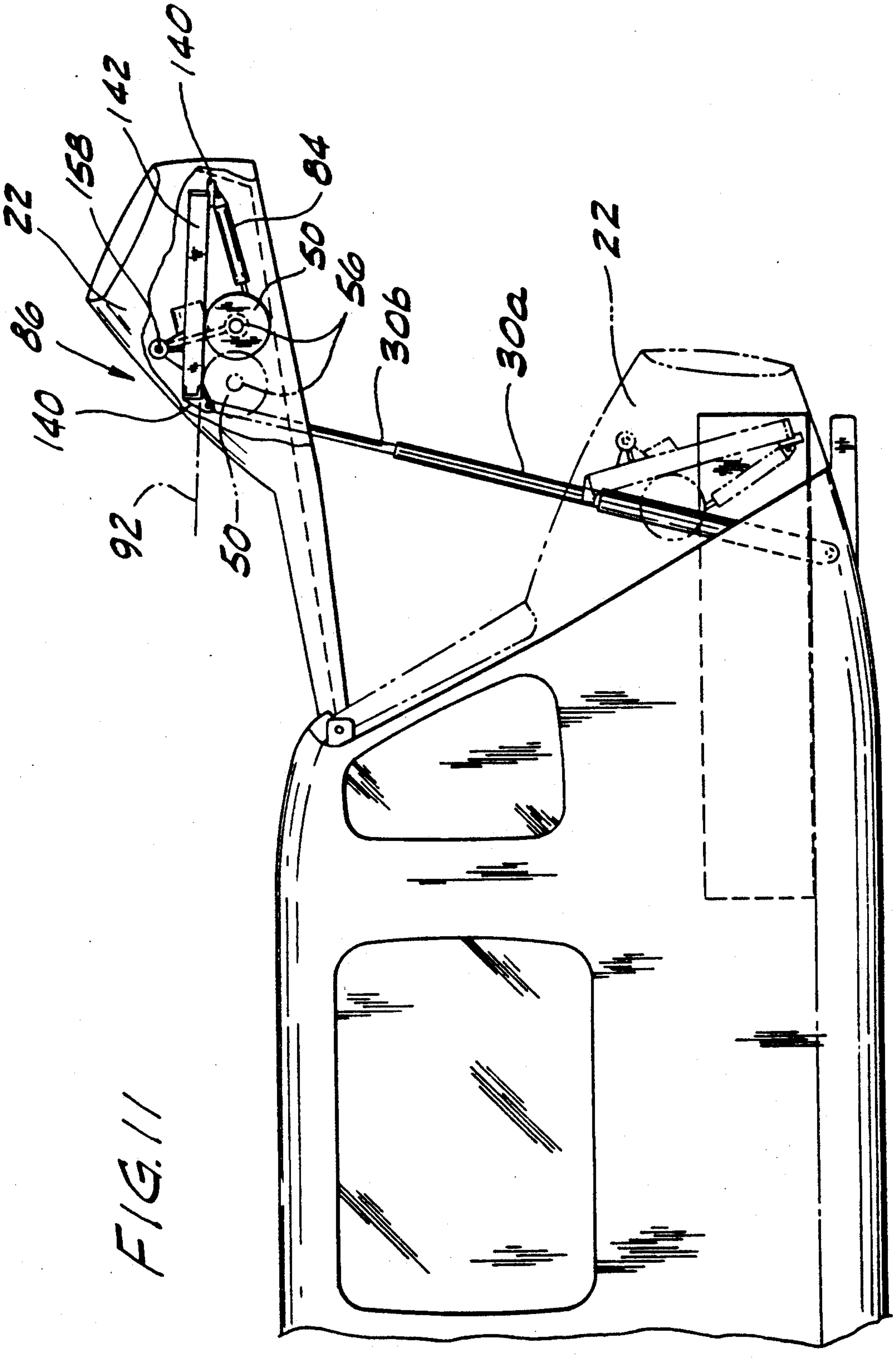
FIG. 11 is an elevation of the front portion of the passenger car showing the gimbal.

In another and more preferred embodiment, leveling means 86 comprises a gimbal 140 for keeping the second axis 76 of the winch 50 level when the passenger car is at an angle with the horizontal (see FIGS. 10 and 11). The gimbal 140 includes a supporting structure 142 for supporting the winch 50. The support structure 142 is attached to the end section by journal boxes 144, 146 which are fixedly secured to the underside of the end section. Two journals 148, 150 are received in the journal boxes 144, 146 so that the support structure 142 may freely balance and maintain the axis of rotation of the drums 72 in a substantially horizontal plane. Two journals 152, 154 located on opposite ends of support structure 142 are adapted to be received in journal bearings 148, 150 so that the assembly may freely rotate. This assembly is specially balanced so that the pod is maintained in an upright and stable position when the car is at an angle corresponding to the true horizontal. In addition, bar 56 is journaled at both ends in bearing members 156, 158 for pivoting the winch 50 relative to the support structure 142 between its loading and descent positions (see FIG. 11).

Figure 9:
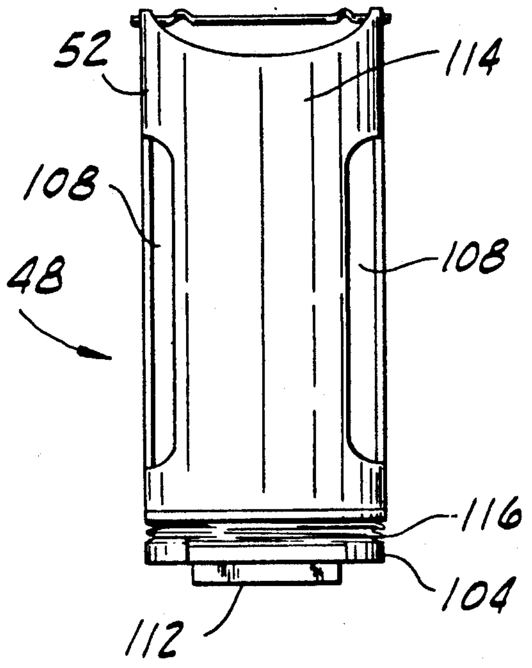
FIG. 9 is a view of the elevator pod of FIG. 8 in its collapsed configuration.
Figure 8:
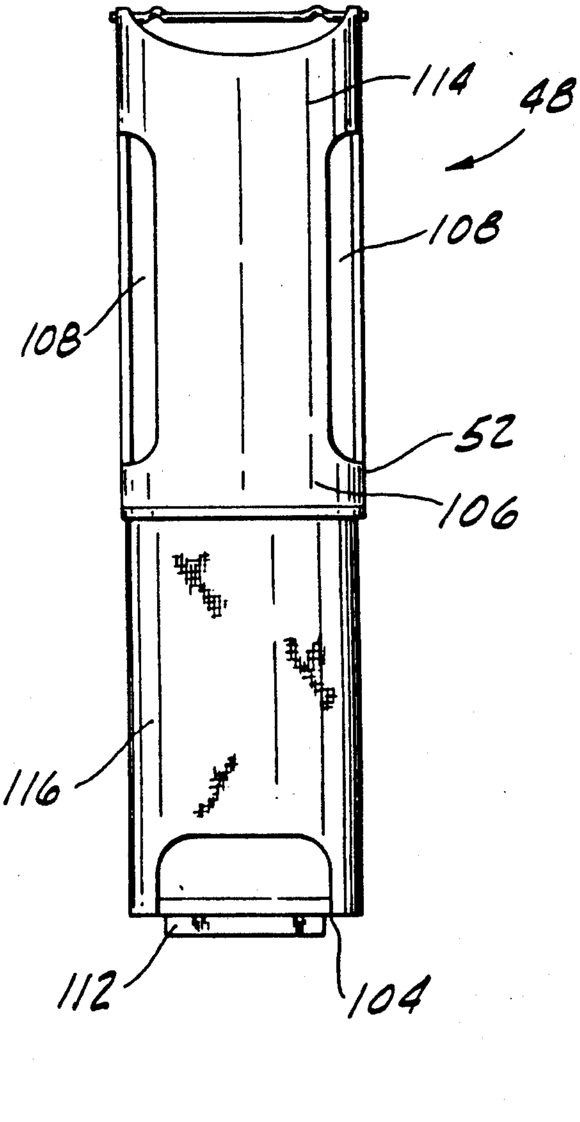
FIG. 8 is a view of an elevator pod of this invention.

The escape pod 52 comprises a floor 104, a generally semi-cylindrical wall 106 projecting up from the floor and an open back. A passenger p boarding the escape pod 52 may extend his arms through slots 108 provided for each arm which allow the passenger to embrace the wall 106 during transportation to the ground. The slots are vertically elongated to accommodate the arms of passengers of various heights. At the bottom of the wall 106 is an opening covered by a panel 110 of flexible material which allows the feet of the passenger to extend through the wall. Ground proximity detecting means 112 associated with the pod 52 detects impact of the floor 104 of the pod with the ground or alternatively may detect when the car is a predetermined distance from the ground. The ground proximity detecting means 112 signals, preferably by radio, the winch 50 to stop lowering the pod. The proximity detector includes a signal generating mechanism for transmitting a signal from the sensor to signal receiving mechanism 170 on the motor. The sensor 112 upon detecting the ground at a certain distance from the bottom of the pod 52 causes the transmitter to transmit a signal to the receiving means 170 which stops the motor. A sensor (not shown) may be provided for detecting the passenger's exit from the pod to the ground. A signal generated by that sensor initiates reverse rotation of the drums 72 to lift the pod 52 up to the debarking platform 40. The upper portion 114 of the wall of the pod 52 is made of light-weight but strong, relatively rigid material. The lower portion 116 of the wall is made of flexible material which is attached to the upper portion 114. As shown in FIG. 9, the lower portion 116 of the wall 106 may be collapsed when the not in use for compact storage of the escape pod 52 in a compartment 118 in the car 10.

In normal operation of the elevated passenger car 10 of this invention, the end section 22 is in its closed position in which the emergency exit 18 from the Passenger compartment 14 is closed to the outside. Should the car 10 become disabled at a location away from a passenger station, or it otherwise becomes necessary for one or more passengers to be evacuated from the car, the car operator may use the emergency escape feature. By triggering a control, the end section struts 28 move to their extended positions thereby swinging the end section 22 to its open position. A second passenger car C may then back up to the open front end of the car 10 as shown in FIG. 4, so that the debarking platform 40 of the car and the walkway W of the second car form a path 42 for passengers p to exit the car and enter the second car.

However, if it is not possible to evacuate the passengers to a second passenger car, the passengers may be lowered to the ground by the elevator 48. In that event, the operator retrieves the collapsed escape pod 52 from its compartment 118 and attaches the pod at its upper end to the two cables 70 hanging down from the drums 72 of the winch 50. The escape pod 52 is initially in its loading position in which the pod floor 104 is closely adjacent the debarking platform 40. One passenger may then exit the passenger compartment 14 onto the debarking platform 40 and step into the pod 52, inserting his arms through the slots 108 in the wall 106 of the car to securely hold himself in it. The operator then triggers the descent sequence of the winch causing the cylinder 84 to retract so that the winch frame 54 pivots about its first axis 60 and the pod 52 swings away from the debarking platform 40 to the descent position. After the cylinder 84 is retracted, the winch motor 78 is started and cable 70 is let out from the drums at a controlled rate to lower the pod 52 to the ground. The ground proximity detecting means 112 signals the winch motor 78 to stop when the car is on or at a predetermined distance from the ground. After the passenger steps out of the pod 52 onto the ground, the winch motor 78 is reactivated for lifting the car back up to the debarking platform 40 and the cylinder 84 is extended to swing the pod back to the loading position for picking up the next passenger.

The evacuation procedure may have to be carried out when the passenger car 10, and hence the winch frame 54, is at an angle to the horizontal. In that event, the level sensor 88 will detect the roll angle of the car once the end section 22 is deployed to its open position. A signal is sent by the sensor 88 to the winch to activate the leveling motor 78 so that the second end 94 of the support bar 56 is pivoted about the third axis 92 until the support bar and the axis of rotation 76 of the drums 72 are horizontal. The leveled winch frame is now oriented to maintain the vertical orientation of the escape pod 52 despite the roll angle of the car 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An elevated passenger car adapted for emergency exit therefrom, the car being of the type adapted to be supported in its elevated position such that there are substantially no obstructions between at least a portion of the underside of the car and the ground below, the car comprising a body having a passenger compartment therein, an opening through the body generally at one end thereof defining an exit from the passenger compartment to outside the body, a debarking platform at said one of the body, an end section pivotally mounted on the body at said one end, means for swinging the end section between a closed position in which the end section closes said exit and an open position in which said exit is opened to the outside, said means for swinging the end section comprising at least one strut pivotally mounted at one end on the body and pivotally attached to the end section at an opposite end thereof, the strut being extensible and retractable for motion between a retracted position in which the end section is in said closed position and an extended position in which the end section is in said open position, an elevator supported by the end section for lowering passengers from the elevated car to below the elevated car, the elevator including which means mounted on the underside of the end section for lowering passengers therefrom and an escape pod adapted to be suspended from said winch means, said winch means swinging conjointly with said end section to a position above the debarking platform in which there is sufficient clearance to allow passengers to walk thereunder, said winch means comprising a frame pivotally attached to the underside of the end section at a first side of the frame for pivoting about a first axis, means mounted on the frame generally at a second side generally opposite said first side of the frame for holding at least two lengths of cable at laterally spaced apart locations, the cables being adapted to be attached at one end to the escape pod at locations spaced laterally of one another for suspending it generally below said cable holding means and preventing the pod from rotating about its vertical axis, said cable holding means being rotatable about a second axis for raising and lowering the pod, and means for moving the elevator between a loading position in which a passenger may board the escape pod from the debarking platform and a descent position in which the pod is clear of the car body for descent to below the elevated car.

2. An elevated passenger car as set forth in claim 1 wherein said one end of the car is adapted to engage an end of another passenger car having an opening therein and a walkway passing through said opening, the debarking platform and walkway defining a path for egress from the car and entry into a passenger compartment of said other passenger car.

3. An elevated passenger car as set forth in claim 1 wherein the escape pod comprises a floor, a wall projecting up from the floor and an open back.

4. An elevated passenger car as set forth in claim 3 wherein the wall has slots therein adapted to receive the arms of a passenger riding the pod for embracing the wall during descent from the car.

5. An elevated passenger car as set forth in claim 3 wherein the escape pod may be collapsed when not in use for compact storage of the escape pod in the passenger car.

6. An elevated passenger car as set forth in claim 5 wherein the escape pod comprises a rigid upper portion and a flexible lower portion, the lower portion of the escape pod being collapsible for compact storage of the escape pod.

7. An elevated passenger car as set forth in claim 6 wherein said cable holding means comprises a pair of drums mounted at spaced apart locations on said second side of the frame for rotation about said second axis constituting the axis of rotation of the drums, each drum holding a length of said cable thereon and wherein said winch means further comprises a motor mounted on the frame for rotating the drums.

8. An elevated passenger car as set forth in claim 7 wherein said means for moving the elevator between said loading position and said descent position comprises a cylinder mounted at one end to the underside of the end section and attached to the frame generally at said second side thereof, the cylinder being adapted to pivot the frame about its first axis between said loading position and said descent position.

9. An elevated passenger car as set forth in claim 7 wherein the elevator further comprises means for leveling the winch means frame to maintain the axis of rotation of the drums at a true horizontal.

10. An elevated passenger car adapted for emergency exit therefrom, the car being of the type adapted to be supported in its elevated position such that there are substantially no obstructions between at least a portion of the underside of the car and the ground below, the car comprising:

a body having a passenger compartment therein;

an opening through the body generally at one end thereof defining an exit from the passenger compartment to outside the body;

an end section pivotally mounted on the body at said one end;

means for swinging the end section between a closed position in which the end section closes said exit and an open position in which said exit is opened to the outside, said means for swinging the end section comprising at least one strut pivotally mounted at one end on the body and pivotally attached to the end section at an opposite end thereof, the strut being extensible and retractable for motion between a retracted position in which the end section is in said closed position and an extended position in which the end section is in said open position;

an elevator supported by the end section for lowering passengers from the elevated car to below the elevated car, the elevator including winch means mounted on the underside of the end section and an escape pod adapted to be suspended from said winch means, and wherein the car body further comprises a debarking platform at said one end of the body, said winch means comprises a frame pivotally attached to the underside of the end section at a first side of the frame for pivoting about a first axis, means mounted on the frame generally at a second side generally opposite said first side of the frame for holding at least two lengths of cable, each adapted to be attached at one end to the escape pod for suspending it generally below said cable holding means, said cable holding means being rotatable about a second axis for raising and lowering the pod and comprising a pair of drums mounted at spaced apart locations on said second side of the frame for rotation about said second axis constituting the axis of rotation of the drums, each drum holding a length of said cable thereon and wherein said winch means further comprises a motor mounted on the frame for rotating the drums, the elevator further comprising means for leveling the winch means frame to maintain the axis of rotation of the drums at a true horizontal, said leveling means is adapted to pivot the frame of the winch means about a third, substantially horizontal axis generally perpendicular to the axis of rotation of the winch drums; and means for moving the elevator between a loading position in which a passenger may board the escape pod from the debarking platform and a descent position in which the pod is clear of the car body for descent to below the elevated car.

11. An elevated passenger car as set forth in claim 10 wherein the frame of said winch means includes a support bar mounted at its first end on the end section of the car for pivoting about said first and third axes and wherein said leveling means comprises a leveling motor having a drive shaft connected to said support bar generally at a second end opposite said first end of said support bar, the leveling motor being adapted to move said second end of the support bar generally longitudinally of the drive shaft for raising and lowering said second end of said support bar relative to its first end thereby to maintain said axis of rotation of the winch drums at a true horizontal orientation.

12. An elevated passenger car as set forth in claim 11 further comprising means for sensing deviation of said axis of rotation of the winch drums from a true horizontal and for sending a signal to said leveling means to actuate leveling of the frame.

13. An elevated passenger car as set forth in claim 12 wherein the escape pod has means associated therewith for detecting the proximity of the ground beneath the pod, said proximity detecting means being adapted to signal the winch means to stop lowering the pod when said car is a predetermined distance from the ground.

14. An elevated passenger car adapted for emergency exit therefrom, the car being of the type adapted to be supported in its elevated position such that there are substantially no obstructions between at least a portion of the underside of the car and the ground below, the car comprising a body having a passenger compartment therein, an opening through the body generally at one end thereof defining an end section pivotally mounted on the body at said one end, means for swinging the end section between a closed position in which the end section closes said exit and an open position in which said exit is opened to the outside, an elevator supported by the end section for lowering passengers from the elevated car to below the elevated car, and means for leveling the elevator to maintain it at a true horizontal, said leveling means comprising a gimbal adapted to support the elevator thereon, the gimbal being mounted for rotation to the underside of the end section.

15. An elevated passenger car adapted for emergency exit therefrom, the car being of the type adapted to be supported in its elevated position such that there are substantially no obstructions between at least a portion of the underside of the car and the ground below, the car comprising:

a body having a passenger compartment therein;

an opening through the body generally at one end thereof defining an exit from the passenger compartment to outside the body;

an end section pivotally mounted on the body at said one end;

means for swinging the end section between a closed position in which the end section closes said exit and an open position in which said exit is opened to the outside, said means for swinging the end section comprising at least one strut pivotally ;mounted at one end on the body and pivotally attached to the end section at an opposite end thereof, the strut being extensible and retractable for motion between a retracted position in which the end section is in said closed position and an extended position in which the end section is in said open position;

an elevator supported by the end section for lowering passengers from the elevated car to below the elevated car, the eleveator including winch means mounted on the underside of the end section and an escape pod adapted to be suspended from said winch means, and wherein the car body further comprises a debarking platform at said one end of the body, said winch means comprises a frame pivotally attached to the underside of the end section at a first side of the frame for pivoting about a first axis, means mounted on the frame generally at a second side generally opposite said first side of the frame for holding at least two lengths of cable, each adapted to be attached at one end to the escape pod for suspending it generally below said cable holding means, said cable holding means being rotatable about a second axis for raising and lowering the pod and comprising a pair of drums mounted at spaced apart locations on said second side of the frame for rotation about said second axis constituting the axis of rotation of the drums, each drum holding a length of said cable thereon and wherein said winch means further comprises a motor mounted on the frame for rotating the drums, the elevator further comprising means for leveling the winch means frame to maintain the axis of rotation of the drums at a true horizontal, said leveling means comprising a gimbal on which the winch is mounted, the gimbal being mounted for rotation to the underside of the end section to maintain the axis of rotation of the drums of said winch substantially at true horizontal; and means for moving the elevator between a loading position in which a passenger may board the escape pod from the debarking platform and a descent position in which the pod is clear of the car body for descent to below the elevated car.

* * * * *